United States Patent
Kakeya et al.

(10) Patent No.: US 9,269,952 B2
(45) Date of Patent: Feb. 23, 2016

(54) POSITIVE ACTIVE MATERIAL FOR ALKALINE SECONDARY BATTERY, METHOD FOR MANUFACTURING THE SAME AND ALKALINE SECONDARY BATTERY

(75) Inventors: Tadashi Kakeya, Kyoto (JP); Manabu Kanemoto, Kyoto (JP); Mitsuhiro Kodama, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 63 days.

(21) Appl. No.: 13/978,957

(22) PCT Filed: Jan. 11, 2012

(86) PCT No.: PCT/JP2012/050351
§ 371 (c)(1),
(2), (4) Date: Jul. 10, 2013

(87) PCT Pub. No.: WO2012/096294
PCT Pub. Date: Jul. 19, 2012

(65) Prior Publication Data
US 2013/0295450 A1 Nov. 7, 2013

(30) Foreign Application Priority Data

Jan. 11, 2011 (JP) .................... 2011-003426
Jan. 18, 2011 (JP) .................... 2011-007696

(51) Int. Cl.
*H01M 4/525* (2010.01)
*H01M 4/36* (2006.01)
(Continued)

(52) U.S. Cl.
CPC ............ *H01M 4/525* (2013.01); *C01F 17/0043* (2013.01); *C01G 51/00* (2013.01); *C01G 53/006* (2013.01); *C01G 53/04* (2013.01); *H01M 4/366* (2013.01); *H01M 4/382* (2013.01); *H01M 4/48* (2013.01); *H01M 10/24* (2013.01); *H01M 10/26* (2013.01); *C01P 2002/76* (2013.01); *C01P 2002/77* (2013.01); *C01P 2004/32* (2013.01); *C01P 2004/61* (2013.01);
(Continued)

(58) Field of Classification Search
None
See application file for complete search history.

(56) References Cited

U.S. PATENT DOCUMENTS 5,804,334 A    9/1998  Yamamura et al.
5,965,295 A *  10/1999 Bando et al. ................. 429/223
(Continued)

FOREIGN PATENT DOCUMENTS

CN    101117243    2/2008
JP    9-199131    7/1997
(Continued)

OTHER PUBLICATIONS

International Search Report dated May 1, 2012 filed in PCT/JP2012/050351.
(Continued)

*Primary Examiner* — Patrick Ryan
*Assistant Examiner* — Wyatt McConnell
(74) *Attorney, Agent, or Firm* — Rankin, Hill & Clark LLP

(57) ABSTRACT

A positive active material for an alkaline secondary battery having a core layer containing nickel hydroxide and a conductive auxiliary layer which coats the surface of the core layer, wherein the conductive auxiliary layer contains a cobalt oxyhydroxide phase and a cerium dioxide phase, and the active material contains lithium.

13 Claims, 5 Drawing Sheets

(51) Int. Cl.

| | |
|---|---|
| *H01M 4/38* | (2006.01) |
| *H01M 4/48* | (2010.01) |
| *H01M 10/24* | (2006.01) |
| *H01M 10/26* | (2006.01) |
| *C01G 51/00* | (2006.01) |
| *C01G 53/00* | (2006.01) |
| *C01G 53/04* | (2006.01) |
| *C01F 17/00* | (2006.01) |

(52) U.S. Cl.
CPC ........ *C01P 2004/82* (2013.01); *C01P 2004/84* (2013.01); *C01P 2006/40* (2013.01); *Y02E 60/124* (2013.01)

(56) References Cited

U.S. PATENT DOCUMENTS

| | | | |
|---|---|---|---|
| 5,993,995 | A | 11/1999 | Bernard et al. |
| 6,077,625 | A | 6/2000 | Yano et al. |
| 6,218,046 | B1 * | 4/2001 | Tanigawa et al. .............. 429/223 |
| 6,287,726 | B1 | 9/2001 | Ohta et al. |
| 8,057,934 | B2 | 11/2011 | Miiyamoto et al. |
| 8,877,372 | B2 | 11/2014 | Kanemoto |
| 8,883,349 | B2 | 11/2014 | Kanemoto |
| 2001/0018148 | A1 * | 8/2001 | Ohta et al. ..................... 429/223 |
| 2004/0175615 | A1 | 9/2004 | Ovshinsky et al. |
| 2004/0197656 | A1 | 10/2004 | Durkot et al. |
| 2005/0026039 | A1 * | 2/2005 | Ito et al. ........................ 429/223 |
| 2006/0029864 | A1 | 2/2006 | Matsumoto et al. |
| 2006/0166099 | A1 | 7/2006 | Okabe et al. |
| 2008/0145756 | A1 * | 6/2008 | Taniguichi .................... 429/206 |
| 2009/0239144 | A1 | 9/2009 | Izumi et al. |
| 2012/0115034 | A1 | 5/2012 | Morishita et al. |
| 2013/0136992 | A1 | 5/2013 | Kanemoto |
| 2013/0280602 | A1 | 10/2013 | Kanemoto |

FOREIGN PATENT DOCUMENTS

| | | |
|---|---|---|
| JP | 10-50308 | 2/1998 |
| JP | 10-074536 | 3/1998 |
| JP | 10-261412 | 9/1998 |
| JP | 11-7949 | 1/1999 |
| JP | 11-7950 | 1/1999 |
| JP | 11-147719 | 6/1999 |
| JP | 2000-223119 | 8/2000 |
| JP | 2001-006679 | 1/2001 |
| JP | 2004-247288 | 9/2004 |
| JP | 2006-59807 | 3/2006 |
| JP | 2007-059071 | 3/2007 |
| JP | 2007-149646 | 6/2007 |
| WO | 2006/064979 | 6/2006 |
| WO | 2011/007858 | 1/2011 |
| WO | 2012/018077 | 2/2012 |

OTHER PUBLICATIONS

Extended European Search Report dated Oct. 13, 2014 issued in the corresponding European patent application No. 12734089.1.
Wang, Dian-long et al. "Surface behavior of pasted nickel electrodes with electrodeposited Co—Ce on substrate," Trans. Nonferrous Met. Soc. China, 16, 2006, pp. 1148-1153.; Cited in Extended European Search Report.

* cited by examiner

POSITIVE ACTIVE MATERIAL FOR ALKALINE SECONDARY BATTERY, METHOD FOR MANUFACTURING THE SAME AND ALKALINE SECONDARY BATTERY

TECHNICAL FIELD

The present invention relates to an active material used for an unsintered positive electrode of an alkaline secondary battery, and an alkaline secondary battery.

BACKGROUND ART

As a positive electrode of an alkaline secondary battery, an unsintered electrode obtained by filling a paste containing an active material into a nickel foam substrate is used. In this case, since nickel hydroxide, which is an active material in a discharged state, is low in electric conductivity, cobalt oxyhydroxide (CoOOH) having high electric conductivity is often utilized as an electroconductive additive in order to increase the utilization factor of the active material. For example, a powder of cobalt oxide (CoO), cobalt hydroxide ($Co(OH)_2$), or cobalt oxyhydroxide is added to a paste containing an active material. Cobalt oxide and cobalt hydroxide are oxidized into cobalt oxyhydroxide at the time of initial charge, and cobalt oxyhydroxide acts as an electroconductive additive. Further, the surface of the nickel hydroxide particles may be coated with a cobalt compound.

Cobalt oxyhydroxide is stable in a normal battery operating voltage range and insoluble in an alkaline electrolyte solution. However, when a positive potential approaches a negative potential by overdischarge of a battery or a battery is in a state of reverse charge, cobalt oxyhydroxide is reduced, resulting in a decrease in an oxidation number of cobalt (Co) and a reduction in electric conductivity. If cobalt oxyhydroxide is further reduced into cobalt hydroxide, it is eluted into an electrolyte solution, and does not serve as an electroconductive additive.

From this situation, an attempt to inhibit the reduction of cobalt oxyhydroxide is made. For example, in Patent Document 1 is proposed a constitution in which antimony or the like is added to an oxidized compound of cobalt. However, although a lot of substances to be added to an oxidized compound of cobalt are described in Patent Document 1, only a few substances of these substances, such as magnesium and aluminum, are actually evaluated for the change in the battery capacity as experimental data, and these descriptions do not allow presumption as to the characteristics exhibited by other substances.

In Patent Document 2 is described a nickel positive electrode for an alkaline secondary battery, which has nickel hydroxide and a divalent or higher cobalt compound which coats the surface of nickel hydroxide, and contains a compound such as calcium in a coating layer thereof. It is described that the oxygen generation overvoltage increases by containing a compound such as calcium.

On the other hand, in order to increase the capacity of the active material itself, an attempt to utilize γ type nickel oxyhydroxide is made. In a common alkaline secondary battery, nickel hydroxide (the oxidation number of Ni is 2) turns into β type nickel oxyhydroxide (the oxidation number of Ni is 3) by charging. The oxidation number of Ni of γ type nickel oxyhydroxide is about 3.5 to 3.7, and therefore a battery capacity can be theoretically increased.

However, since γ type nickel oxyhydroxide has a crystal structure in which alkali metal ions or water molecules are incorporated into a space between layers thereof, and has a larger volume than β type nickel oxyhydroxide, a swelling phenomenon of a positive electrode occurs if γ type nickel oxyhydroxide is produced in charging, and the positive electrode absorbs an alkali electrolyte solution retained in a separator to cause internal resistance of a battery to increase, and hence there is a problem that the cycle life of the battery is shortened.

In order to solve this problem, in Patent Document 3 is proposed a positive active material for an alkaline secondary battery principally made of $Ni(OH)_2$, including nickel hydroxide having an oxidation number of Ni larger than 2 and including a higher cobalt compound containing a first alkali cation on the surface of nickel hydroxide, in which nickel hydroxide having an oxidation number of Ni larger than 2 contains a second alkali cation. In the examples, a nickel hydroxide compound containing about 0.7% by mass of lithium ions is disclosed. It is described that by the effect of inclusion of alkali ions in nickel hydroxide, the alkali cation concentration in the electrolyte solution is not changed even when γ type nickel oxyhydroxide is produced during charging.

Further, in Patent Document 4 is described active material particles made of composite particles, in which a surface layer principally made of a higher cobalt compound of cobalt having an oxidation number larger than +2 is provided on the surface of core layer particles principally made of higher nickel hydroxide, wherein lithium is solid solution in the active material particles in an amount which corresponds to 0.01 to 0.5 wt % of lithium as simple substance. It is described in Patent Document 4 that by incorporating lithium into a crystal of nickel hydroxide, the active material particles are stable even when the oxidation number of Ni is +3.2 to +3.4.

PRIOR ART DOCUMENTS

Patent Documents

Patent Document 1: JP-A-10-50308
Patent Document 2: JP-A-10-261412
Patent Document 3: JP-A-2000-223119
Patent Document 4: International Publication WO 06/064979
Patent Document 5: JP-A-11-147719

SUMMARY OF THE INVENTION

Problems to be Solved by the Invention

The present invention was made in view of these problems, and it is an object of the present invention to provide an alkaline secondary battery exhibiting larger discharge capacity than a conventional battery and exhibiting little performance degradation in an overdischarged state, and to provide a positive active material for an alkaline secondary battery for realizing the alkaline secondary battery.

Means for Solving the Problems

A positive active material for an alkaline secondary battery according to the present invention has a core layer containing nickel hydroxide and a conductive auxiliary layer which coats a surface of the core layer, wherein the conductive auxiliary layer contains a cobalt oxyhydroxide phase and a cerium dioxide phase, and the active material contains lithium.

The inclusion of the cerium dioxide phase in the conductive auxiliary layer enables the inhibition of reduction of cobalt oxyhydroxide even in conditions such as overdischarge. The inclusion of lithium in the active material and the inclusion of the cerium dioxide phase in the conductive auxiliary layer enable the increase of the battery discharge capacity.

Further, the positive active material for an alkaline secondary battery according to the present invention preferably has a core layer containing nickel hydroxide and a conductive auxiliary layer which coats the surface of the core layer, wherein the conductive auxiliary layer contains a cobalt oxyhydroxide phase and a cerium dioxide phase, and the active material is subjected to a lithium impregnation treatment.

Further, in the positive active material for an alkaline secondary battery according to the present invention, the core layer and the conductive auxiliary layer preferably contain lithium.

Further, in the positive active material for an alkaline secondary battery according to the present invention, an amount of lithium contained in the active material preferably corresponds to 0.03% by mass or more and 0.36% by mass or less of lithium as element.

Further, in the positive active material for an alkaline secondary battery according to the present invention, the abundance of the cerium dioxide phase to the total of the cobalt oxyhydroxide phase and the cerium dioxide phase in the conductive auxiliary layer is preferably 6.5% by mass or more and 88.2% by mass or less.

The electric conductivity of the conductive auxiliary layer can be made a practical value while improving the reduction resistance of cobalt oxyhydroxide by setting the abundance of the cerium dioxide phase to this range.

A method for manufacturing a positive active material for an alkaline secondary battery according to the present invention is a method for manufacturing the above-mentioned positive active material for an alkaline secondary battery, which includes the step of adding an aqueous solution containing cobalt ions and cerium ions to an aqueous solution obtained by dispersing particles containing nickel hydroxide therein to form a coating layer of a hydroxide containing cobalt and cerium on the surface of the core layer containing nickel hydroxide, wherein in the aqueous solution containing cobalt ions and cerium ions, the atomic ratio (Co:Ce) between cobalt and cerium is in a range of 95:5 to 30:70.

Thereby, the electric conductivity of the conductive auxiliary layer can be made a practical value while improving the reduction resistance of cobalt oxyhydroxide in the conductive auxiliary layer.

Further, the method for manufacturing a positive active material for an alkaline secondary battery according to the present invention preferably includes an oxidation step of heating the particles in which the coating layer of the hydroxide containing cobalt and cerium is formed on the surface of the core layer containing nickel hydroxide at a temperature of 50 to 150° C. in the coexistence of oxygen and an alkaline aqueous solution principally made of sodium hydroxide, and a lithium treatment step of retaining the particles subjected to the oxidation treatment in an aqueous lithium hydroxide solution to impregnate the particles with lithium.

By these steps, it is possible to surely make lithium penetrate into the active material.

An alkaline secondary battery according to the present invention includes any one of the above-mentioned positive active materials for an alkaline secondary battery.

Alternatively, the alkaline secondary battery according to the present invention includes a positive active material for an alkaline secondary battery having a core layer containing nickel hydroxide and a conductive auxiliary layer which coats the surface of the core layer, wherein the conductive auxiliary layer contains a cobalt oxyhydroxide phase and a cerium dioxide phase, and an electrolyte solution containing lithium hydroxide.

Further, the alkaline secondary battery according to the present invention preferably includes any one of the abovementioned positive active materials for an alkaline secondary battery, and further includes an electrolyte solution containing lithium hydroxide.

Further, in the alkaline secondary battery according to the present invention, the electrolyte solution preferably contains lithium hydroxide of 0.25 mol/L or more and 1 mol/L or less.

Thereby, it is possible to realize an alkaline secondary battery exhibiting larger discharge capacity than a conventional battery, and exhibiting little performance degradation in an overdischarged state.

Advantages of the Invention

In accordance with the present invention, it is possible to realize an alkaline secondary battery exhibiting larger discharge capacity than a conventional battery, and exhibiting little performance degradation in an overdischarged state.

MODE FOR CARRYING OUT THE INVENTION

Figure 1:
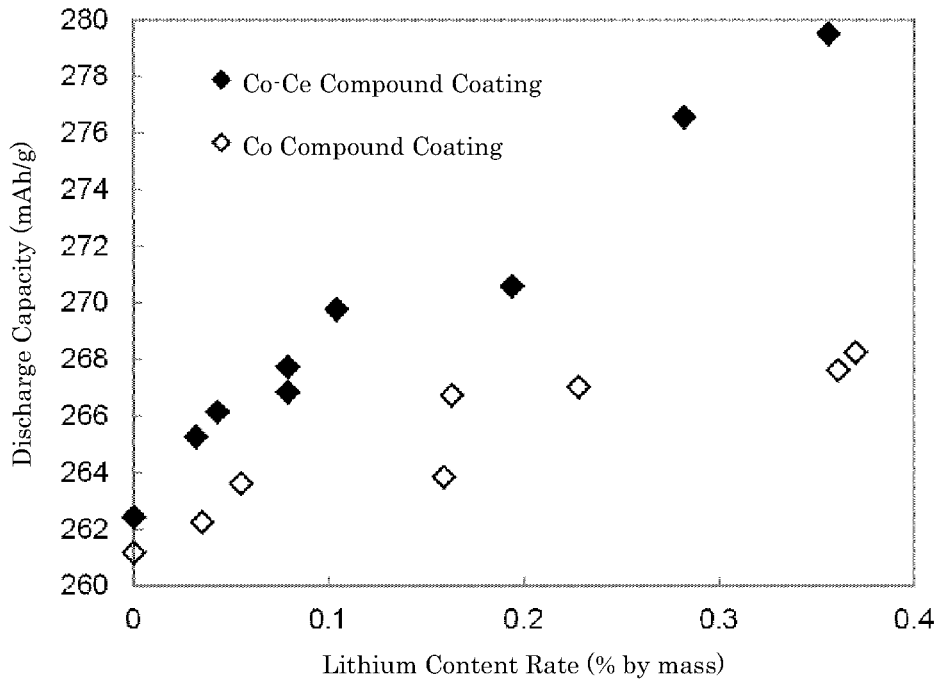
FIG. 1: A graph showing the discharge capacity of batteries of examples and comparative examples.

First, an embodiment of a positive active material for an alkaline secondary battery according to the present invention will be described.

An active material according to the present invention is composite particles composed of a core layer containing nickel hydroxide and a conductive auxiliary layer which coats the surface of the core layer.

Nickel hydroxide is an active material which is oxidized or reduced associated with charge-discharge of the alkaline secondary battery. The core layer may contain other components for reforming nickel hydroxide. For example, the core layer may contain Zn in order to prevent swelling of an electrode.

The core layer preferably contains Co in order to improve charge efficiency at elevated temperatures. When the concentration of Zn and Co is too high, since the amount of the active material to be filled is relatively decreased, resulting in a reduction of the battery capacity, the concentration is preferably 7% by mass or less. This concentration is expressed in terms of the mass of Zn element or Co element with respect to the mass of the whole active material particles.

The active material according to the present invention contains Li.

In order to enhance the stability of a crystal of nickel hydroxide composing the core layer, Li is preferably solid solution in a crystal of nickel hydroxide. However, when the amount of lithium contained in nickel hydroxide is too large, there are problems that when a paste thereof is formed, the pH is too high, and that the active material particles are coagulated due to the deliquescence of Li to make it difficult to manufacture an electrode plate.

The amount of lithium contained in the active material preferably corresponds to 0.03% by mass or more and 0.36% by mass or less, and more preferably 0.05% by mass or more and 0.15% by mass or less in terms of the ratio of Li as simple substance to the whole active material particles of the core layer and the conductive auxiliary layer combined. The above-mentioned problems resulting from Li can be inhibited while exerting the effect of the present invention by setting the amount of lithium to this range.

The conductive auxiliary layer contains a cobalt oxyhydroxide phase and a cerium dioxide phase. The conductive auxiliary layer may contain a small amount of a tricobalt tetroxide phase, as described later. Further, the abundance of the cerium dioxide phase to the total of the cobalt oxyhydroxide phase and the cerium dioxide phase in the conductive auxiliary layer is preferably 6.5% by mass or more and 88.2% by mass or less.

The amount of use of the cobalt-cerium compound (the amount of the cobalt-cerium compound which coats the surface of the nickel hydroxide particles) as the conductive auxiliary layer is preferably 0.1% by mass or more and 10% by mass or less with respect to the total of the cobalt-cerium compound and nickel hydroxide. By precipitating the conductive auxiliary layer on the surface of the nickel hydroxide particles, a conductive network is formed, and therefore an electrode for an alkaline secondary battery having low internal resistance can be obtained. However, when the amount of use of the cobalt-cerium compound is less than 0.1% by mass, an electrode for an alkaline secondary battery having adequately low internal resistance cannot be obtained. In addition, when the amount of use is more than 10% by mass, the amount of a nickel active material in the electrode is relatively decreased to deteriorate volume efficiency of the battery. Although this preferable range of the amount of use is applied without problem when the content rate of the total of the cobalt oxyhydroxide phase and the cerium dioxide phase, which are contained in the cobalt-cerium compound, is 94% by mass or more, when the content rate of both of the phases is small, it is preferred to change the range of the amount of use to a range including a larger amount so that the total amount of the cobalt oxyhydroxide phase and the cerium dioxide phase becomes similar to the above-mentioned content rate.

Since the active material according to the present invention contains lithium and the conductive auxiliary layer contains the cerium dioxide phase, a battery prepared by using the active material and the conductive auxiliary layer can achieve the effect of increasing the discharge capacity. The detail will be described later based on examples.

Further, since the conductive auxiliary layer contains the cerium dioxide phase, the present invention has the effect of inhibiting the reduction of cobalt oxyhydroxide in the case where the battery is overdischarged or reversely charged.

Since cobalt oxyhydroxide is used as a cobalt compound, it is possible to maintain a state in which the cobalt oxyhydroxide phase exists in micro form together with the cerium dioxide phase as they were produced even when the battery is used. That is, the reason for this is as follows: when cobalt hydroxide or the like is used as a compound of cobalt, since cobalt hydroxide or the like undergoes a process of being dissolved in an electrolyte solution, oxidized in initial charge and reprecipitated as cobalt oxyhydroxide, separation of the cobalt oxyhydroxide phase from the cerium dioxide phase proceeds, and on the other hand, when cobalt oxyhydroxide is used as a compound of cobalt, cobalt oxyhydroxide does not undergo a process of being dissolved and reprecipitated when the battery is used.

The present inventors made detailed investigations in order to check the effect of inclusion of the cerium dioxide phase in the conductive auxiliary layer, and to determine an appropriate content. Specifically, since particles containing a cobalt oxyhydroxide phase and a cerium dioxide phase (hereinafter, also referred to as cobalt-cerium compound particles) were prepared, and the crystal structure, specific resistance value and reduction resistance of the particles were evaluated. The contents of investigations will be described below.

Cobalt-cerium compound particles serving as a sample are prepared by dissolving a cobalt compound and a cerium compound to obtain an aqueous solution containing Co ions and Ce ions (hereinafter, sometimes abbreviated as an "aqueous Co—Ce solution"), adding the obtained aqueous Co—Ce solution dropwise to a solution with the pH adjusted to a constant value to precipitate a hydroxide containing cobalt and cerium in the aqueous solution, and subjecting the hydroxide to an oxidation treatment. The concentration of a compound in the prepared particles can be adjusted by changing the ratio between the cobalt compound and the cerium compound to be dissolved.

Cobalt sulfate and cerium nitrate were dissolved in water in a predetermined ratio in such a way that the total of Co atoms and Ce atoms was 1.6 mol/L (liter) to prepare an aqueous Co—Ce solution. The ratio between cobalt sulfate and cerium nitrate was varied from 100:0 to 30:70 in terms of the atomic ratio between Co and Ce (Co:Ce).

An aqueous NaOH solution was controlled so as to keep a pH of 9 and a temperature of 45° C., and the above-mentioned aqueous Co—Ce solution was added dropwise to the aqueous NaOH solution while vigorously stirring the resulting mixture to precipitate a hydroxide containing cobalt and cerium. The pH of the aqueous NaOH solution serving as a bath for adding dropwise was adjusted by appropriately adding a 18% by mass aqueous NaOH solution. The precipitate was collected by filtration, washed with water, and dried to obtain hydroxide particles containing cobalt and cerium.

40 g of a 48% by mass aqueous NaOH solution was added to 50 g of the hydroxide particles containing cobalt and cerium, and the resulting mixture was heated at 120° C. for 1 hour in the air, and the resulting reactant was filtrated, washed with water, and dried to obtain desired cobalt-cerium compound particles.

By analyzing, by a Rietveld method, measurement results of the obtained cobalt-cerium compound particles by an X-ray diffractometer, the crystal structure was identified, and the abundance of a phase having the identified crystal structure was identified. As the X-ray diffractometer, product number MO6XCE manufactured by Bruker AXS was used, and measurement conditions were set to 40 kV and 100 mA (Cu tube). Analysis by the Rietveld method was performed by use of RIETAN 2000 (F. Izumi, T. Ikeda, Mater. Sci. Forum, 321-324 (2000), p. 198) as analysis software.

The specific resistance value is a value obtained by measurement of powder resistance. The measurement of powder resistance was performed by putting 50 mg of a sample powder in a circular mold of 4 mm in radius, and pressurizing the powder to 10 MPa. The specific resistance value (an inverse of electric conductivity) of the sample powder can be determined from the measurement result.

Figure 8:
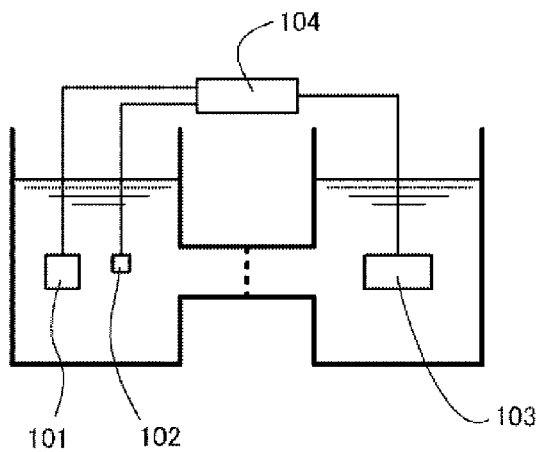
FIG. 8: A drawing showing a configuration of an evaluation device of a cobalt-cerium compound.

Ease of being reduced of the sample was evaluated by measuring the reduction current by use of an apparatus shown in FIG. 8.

A working electrode 101 formed by filling the cobalt-cerium compound serving as a sample into a nickel foam, a reference electrode (Hg/HgO) 102 and a counter electrode 103 which is a hydrogen storage alloy electrode like a negative electrode of a common nickel-metal hydride battery are arranged in an electrolyte solution (6.8 mol/L aqueous KOH solution), and a current flowed is measured with the potential of the working electrode 101 set with reference to the reference electrode 102 by a control device 104. When the potential of the working electrode 101 is set to −1 V (almost the same potential as in the counter electrode 103) at which the cobalt-cerium compound tends to cause a reduction reaction, the flowed current is generated due to the reduction reaction, and by determining the integral of the current flowed by the reduction reaction, the likelihood of the reduction reaction can be quantitatively evaluated.

The working electrode 101 filled with the cobalt-cerium compound was prepared by the following method. A synthesized cobalt-cerium compound was added to a 1% by mass aqueous solution of carboxylmethylcellulose (CMC) and kneaded, and in this, a 40% by mass water dispersion of polytetrafluoroethylene (PTFE) was mixed. The ratio between the cobalt-cerium compound and PTFE (solid content) in the resulting mixture was set to 97:3. The positive electrode paste was filled into a nickel foam substrate having a thickness of 1.4 mm and an area density of 450 g/m$^2$, and dried, and then the resulting substrate was rolled to form an original sheet. The original sheet was cut into a size of 2 cm in length and 2 cm in width, and a tab for current collecting was attached to the original sheet to form a working electrode 101. The amount of the cobalt-cerium compound calculated from the filling amount into the electrode plate was 0.2 g.

A crystal structure of the cobalt-cerium compound was analyzed, and consequently it was found that the cobalt-cerium compound is made principally of a cobalt oxyhydroxide phase having a crystal structure which is a rhombohedral structure and a space group R3m structure (hereinafter, simply referred to as a "cobalt oxyhydroxide phase") and a cerium dioxide phase having a crystal structure which is a fluorite structure and a space group Fm3m structure (hereinafter, simply referred to as a "cerium dioxide phase"), and includes a slight amount of a tricobalt tetroxide crystal phase depending on the preparation condition of the cobalt-cerium compound.

The result obtained by Rietveld analysis of crystal structures of the cobalt oxyhydroxide phase and the cerium dioxide phase which are important among these crystal phases will be described in more detail.

Figure 9:
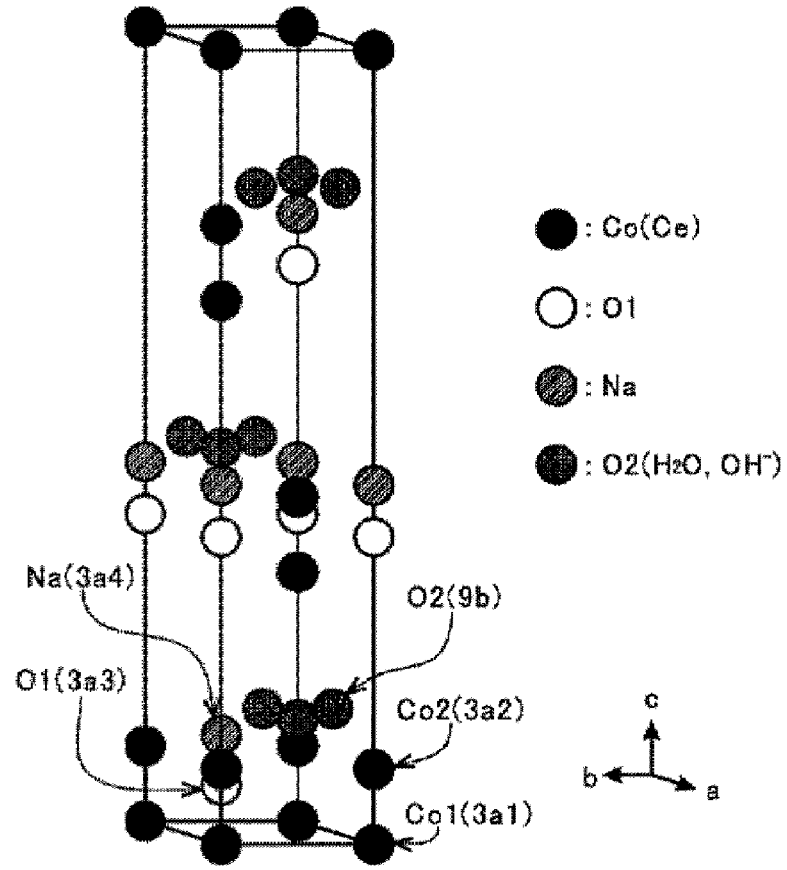
FIG. 9: A drawing showing a crystal structure model of a cobalt oxyhydroxide phase composing a part of a cobalt-cerium compound.

The cobalt oxyhydroxide phase has a crystal structure which is a rhombohedral structure and a space group R3m structure as in the crystal structure model shown in FIG. 9, and contains at least cobalt atoms, oxygen atoms and hydrogen atoms as constituent elements. Further, in the cobalt-cerium compound of the present invention, the cobalt oxyhydroxide phase can contain cerium atoms. These atoms are positioned at predetermined sites shown in FIG. 9. Specifically, Co or Ce is positioned at 3a1 and 3a2 sites, and an oxygen atom (including an oxygen atom composing a water molecule or a hydroxy-ion) is positioned at 3a3 and 9b sites. When cerium is contained, cerium is positioned at 3a1 and 3a2 sites. In addition, no atom is required to be positioned at 3a4 sire, but it is preferred to position Na at 3a4 site as shown in FIG. 9. Positioning of Na at 3a4 site can be performed by making Na and sodium hydroxide coexist when a hydroxide containing cobalt and cerium is subjected to a heat treatment. By containing Na, it is possible to allow oxidation to proceed easily in the oxidation treatment in a manufacturing process.

Figure 10:
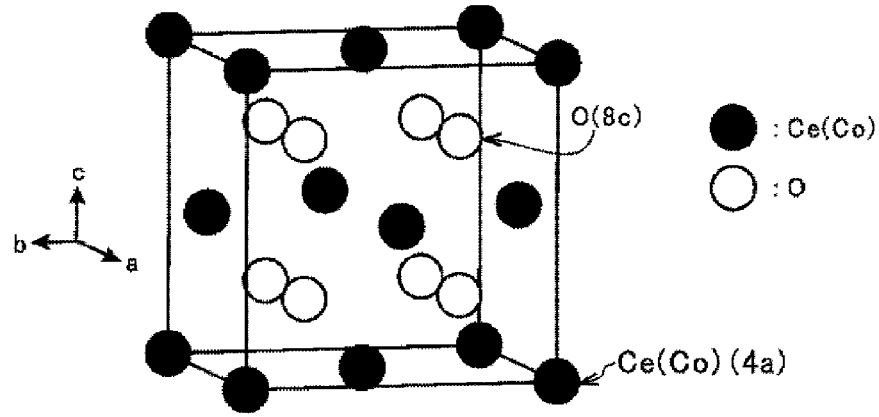
FIG. 10: A drawing showing a crystal structure model of a cerium dioxide phase composing a part of a cobalt-cerium compound.

The cerium dioxide phase has a crystal structure which is a fluorite structure and a space group Fm3m structure as in the crystal structure model shown in FIG. 10, and contains at least cerium atoms and oxygen atoms as constituent elements. Further, in the cobalt-cerium compound of the present sample, the cerium dioxide phase can contain cobalt atoms. These atoms are positioned at predetermined sites shown in FIG. 10. Specifically, Co or Ce is positioned at 4a site, and an oxygen atom is positioned at 8c site. When cobalt is contained in the cerium dioxide phase, cobalt is substituted for a part of cerium.

Measurement results of the specific resistance and the reduction current, and the content rate of each crystal phase of the obtained cobalt-cerium compound particles are shown in Table 4.

The "content rate of cerium" in Table 4 is the content rate of Ce ions to the total of Co ions and Ce ions in the aqueous solution containing cobalt ions and cerium ions in a production process of a cobalt-cerium compound, which is expressed in atomic %. The specific resistance value is a value obtained by the above-mentioned measurement of powder resistance. The amount of reduction current is measured by the above-mentioned method, and the amount of current integrated over 1 hour. The content rate of a crystal phase is a value determined by Rietveld analysis, and the content rates of the cobalt oxyhydroxide phase, the cerium dioxide phase and the tricobalt tetroxide phase in the cobalt-cerium compound are expressed in % by mass. Further, the abundance of the cerium dioxide phase is the abundance of the cerium dioxide phase to the total of the cobalt oxyhydroxide phase and the cerium dioxide phase in the cobalt-cerium compound, which is calculated from the content rate of each phase.

TABLE 4

| Content Rate of Cerium (atomic %) | Specific Resistance Value (Ω cm) | Amount of Reduction Current (mAh) | Content Rate of Crystal Phase (% by mass) | | | Abundance of Cerium Dioxide Phase (% by mass) |
| --- | --- | --- | --- | --- | --- | --- |
| | | | Cobalt Oxyhydroxide Phase | Cerium Dioxide Phase | Tricobalt Tetroxide Phase | |
| 0 | 6.6 | 21.8 | 100.00 | 0.00 | 0.00 | 0.0 |
| 1 | 11.1 | 9.0 | — | — | — | — |
| 5 | 4.2 | 7.7 | 91.27 | 6.36 | 2.37 | 6.5 |
| 10 | 6.4 | 3.7 | 84.96 | 13.19 | 1.84 | 13.4 |
| 30 | 2.8 | 2.3 | 56.60 | 37.74 | 5.66 | 40.0 |
| 40 | 6.2 | 2.3 | 51.42 | 48.59 | 0.00 | 48.6 |
| 50 | 29.9 | 1.5 | — | — | — | — |
| 70 | 34.5 | 1.7 | 11.76 | 88.24 | 0.00 | 88.2 |

Figure 4:
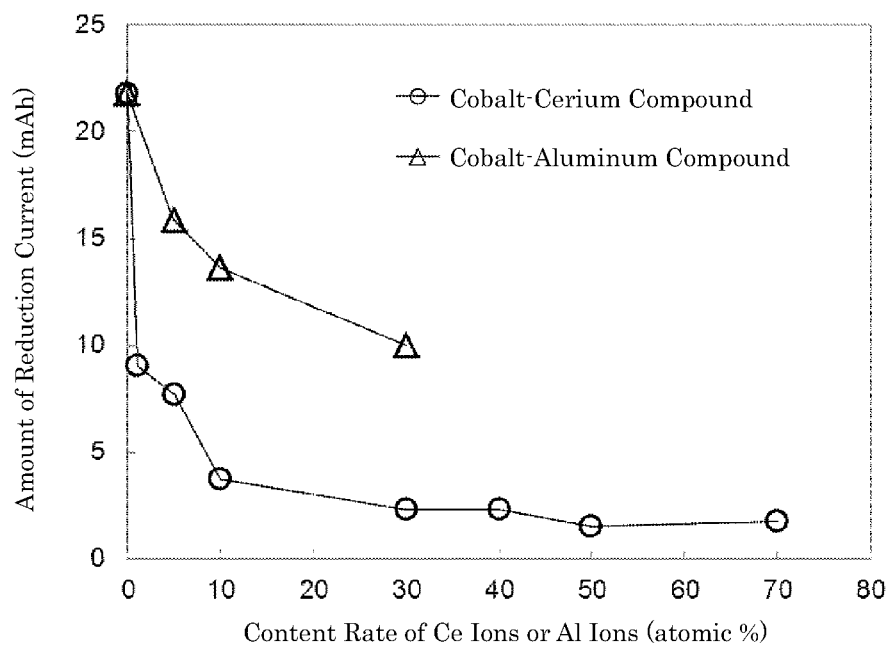
FIG. 4: A graph showing a relation between the amount of reduction current of a cobalt-cerium compound and the content rate of cerium ions.

FIG. 4 is a graph drawn by plotting data in Table 4 indicating a relation between the amount of reduction current and the content rate of cerium (the column on the leftmost side in Table 4). Data of a compound containing aluminum are shown in FIG. 4, and this will be described later.

Data of FIG. 4 show that the amount of reduction current is sharply reduced even when the content rate of cerium is 1 atomic %. That is, the data show that a reduction reaction rapidly becomes hard to occur when the content rate of cerium is 1 atomic % or more. The amount of reduction current is further decreased in a region where the content rate of cerium is 10 atomic % or more, and furthermore decreased in a region of 30 atomic % or more, and maintained at low values up to the data limitation of 70 atomic %.

Figure 5:
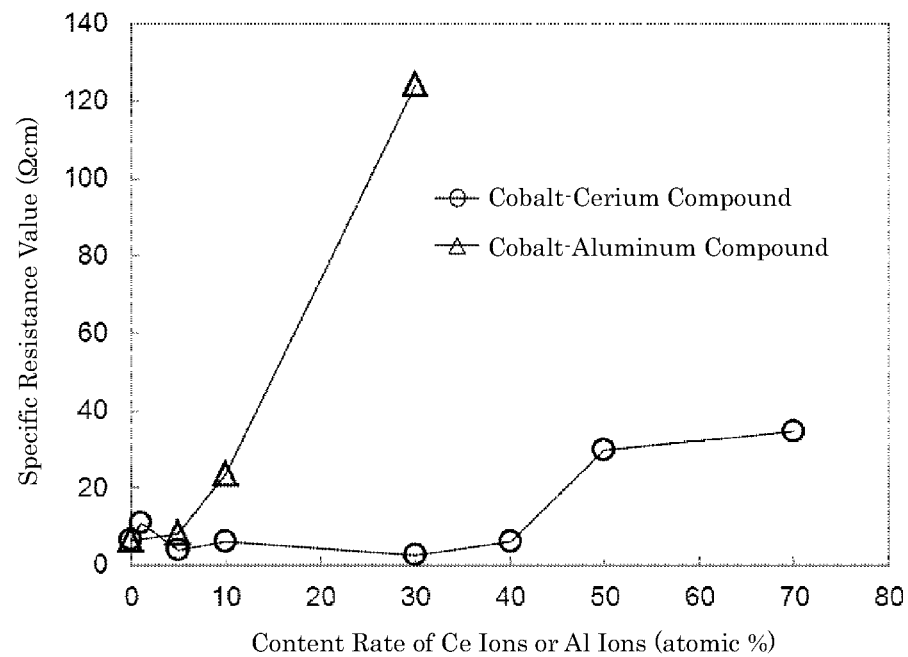
FIG. 5: A graph showing a relation between the specific resistance value of a cobalt-cerium compound and the content rate of cerium ions.

FIG. 5 is a graph drawn by plotting data in Table 4 indicating a relation between the specific resistance value and the content rate of cerium (the column on the leftmost side in Table 4). Data of a compound containing aluminum are also shown in FIG. 5, and this will also be described later.

Data of FIG. 5 show that the specific resistance values at the time when the content rate of cerium is 1 to 40 atomic % are maintained at low values which are rarely different from the specific resistance value at the time of not adding cerium at all. When the content rate of cerium ions is 50 atomic % or more, the specific resistance value is small enough for practical use even though it is increased.

Figure 6:
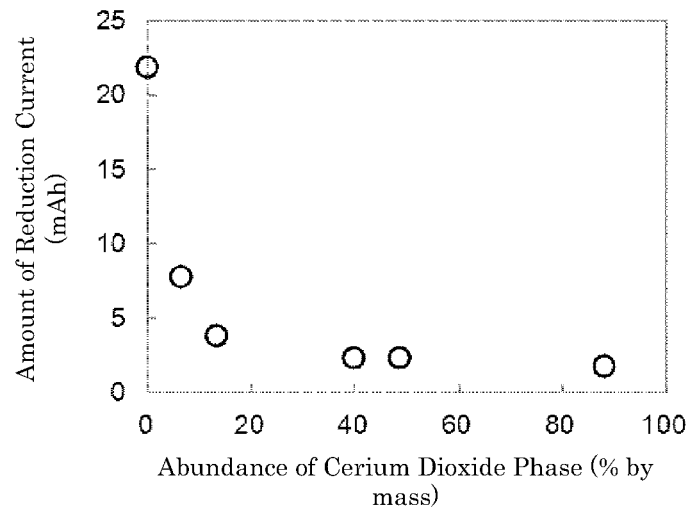
FIG. 6: A graph showing a relation between the amount of reduction current of a cobalt-cerium compound and the abundance of a cerium dioxide phase.

Next, FIG. 6 is a graph drawn by plotting data in Table 4 indicating a relation between the amount of reduction current and the abundance of the cerium dioxide phase (the column on the rightmost side in Table 4).

Data of FIG. 6 also show that the amount of reduction current is sharply reduced by virtue of the existence of the cerium dioxide phase, corresponding to data of FIG. 4. That is, it is found that a reduction reaction becomes hard to occur by virtue of the existence of the cerium dioxide phase. The amount of reduction current is sharply reduced even when the abundance of the cerium dioxide phase is 6.5% by mass. The amount of reduction current is further reduced in a region where the abundance of the cerium dioxide phase is 13.4% by mass or more, and furthermore reduced in a region of 40.0% by mass or more, and maintained at low values up to the data limitation of 88.2% by mass.

Figure 7:
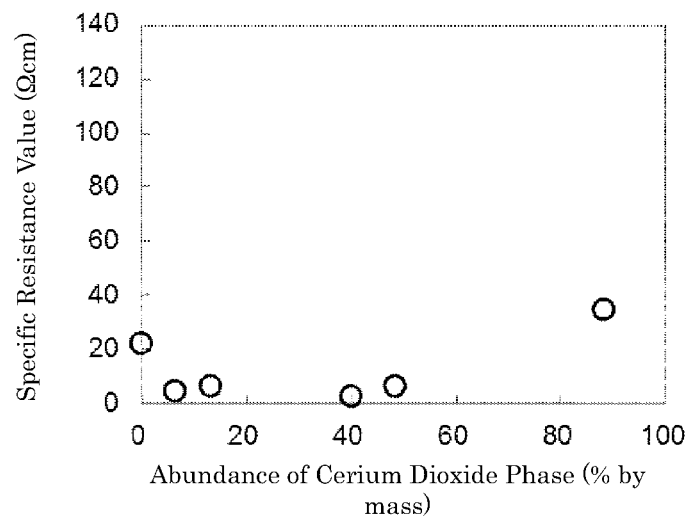
FIG. 7: A graph showing a relation between the specific resistance value of a cobalt-cerium compound and the abundance of a cerium dioxide phase.

Moreover, FIG. 7 is a graph drawn by plotting data in Table 4 indicating a relation between the specific resistance value and the abundance of the cerium dioxide phase (the column on the rightmost side in Table 4).

Data of FIG. 7 also show that the specific resistance values at the time when the abundance of cerium dioxide is 48.6% by mass, corresponding to the content rate of cerium of 40 atomic %, or less are maintained at low values which are rarely different from the specific resistance value at the time of not adding cerium at all, corresponding to data of FIG. 5. When the abundance of cerium dioxide is 88.2% by mass which corresponds to the content rate of cerium ions of 50 atomic %, the specific resistance value is small enough for practical use even though it is increased.

Next, for comparison with the above-mentioned experimental data, the results of experiments on cobalt compounds including an added substance other than cerium will be described. As the substance to be added to the cobalt compound, aluminum (Al), manganese (Mn), magnesium (Mg), yttrium (Y), and iron (Fe) were used. Each of these substances was subjected to the same treatment as in the case of cerium to prepare a compound with cobalt, and the specific resistance and the reduction current were measured as in the case of cerium. The results of measurement are shown in Table 5.

TABLE 5

| Added Element | Content Rate of Added Element (atomic %) | Specific Resistance Value (Ω cm) | Amount of Reduction Current (mAh) |
| --- | --- | --- | --- |
| None | 0 | 6.6 | 21.8 |
| Al | 5 | 8.6 | 15.8 |
| Al | 10 | 23.6 | 13.6 |
| Al | 30 | 124.4 | 10.0 |
| Mn | 30 | 11.2 | 41.5 |
| Mg | 30 | 260.3 | 6.8 |
| Y | 30 | 444.4 | — |
| Fe | 30 | — | 14.5 |

The "content rate of added element" in Table 5 is, as with the "content rate of cerium" in Table 4, the content rate of each element ions to the total of cobalt ions and each element ions in the aqueous solution containing cobalt ions and each element ions in a production process, which is expressed in atomic %. The specific resistance value and the amount of reduction current are similar to those in Table 4.

As shown in Table 5, the content rate of aluminum as an added element was varied in three stages, and the content rate of other elements as added elements was fixed at 30 atomic % to determine approximate characteristics.

Data of the cobalt compound including added aluminum in Table 5, that is, a cobalt-aluminum compound, are shown in FIG. 4 and FIG. 5 together with those of a cobalt-cerium compound.

Comparing the cobalt-cerium compound with the cobalt-aluminum compound, while the amount of reduction current of the cobalt-aluminum compound is considerably higher than that of the cobalt-cerium compound, it exhibits a certain decreasing tendency against an increase in aluminum.

Accordingly, the amount of reduction current is expected to be further reduced by further increasing the content rate of aluminum.

However, comparing the cobalt-cerium compound with the cobalt-aluminum compound on the graph of specific resistance value of FIG. 5, the specific resistance value is rapidly increased as the content rate of aluminum is increased. This means significant impairment of a function as the electroconductive additive, which is an inherent object.

Moreover, as regards other elements in Table 5, in manganese, the specific resistance value is small, but the amount of reduction current is large, and therefore the reduction resistance is shown to be low, in magnesium and yttrium, the specific resistance value is very large, and in iron, the amount of reduction current is large.

Comparing the cobalt-cerium compound with the cobalt compounds including such various elements added, it can be said that the cobalt-cerium compound is peculiar in point of exhibiting extremely excellent values in both of the amount of reduction current and the specific resistance value.

It was found from the result of investigations described above that as a substance to be used for uses requiring both of reduction resistance and a low resistance value, such as an electroconductive additive used for a positive electrode for an alkaline secondary battery, a cobalt-cerium compound containing the cobalt oxyhydroxide phase and the cerium dioxide phase, in which the abundance of the cerium dioxide phase to the total of the cobalt oxyhydroxide phase and the cerium dioxide phase is 6.5% by mass or more and 88.2% by mass or less, responds properly to such requirements. Further, the abundance of the cerium dioxide phase is preferably 13.4% by mass or more and 48.6% by mass or less, and more preferably 40.0% by mass or more and 48.6% by mass or less.

In the cobalt-cerium compound, the cobalt oxyhydroxide phase and the cerium dioxide phase preferably predominantly exist, and specifically, the total of these two phases is preferably 50% by mass or more, more preferably 75% by mass or more, and further preferably 94% by mass or more, or 98% by mass or more.

Next, a method for manufacturing the positive active material for an alkaline secondary battery which is an embodiment of the present invention will be described. This method is an embodiment of the method for manufacturing a positive active material for an alkaline secondary battery of the present invention.

Figure 3:
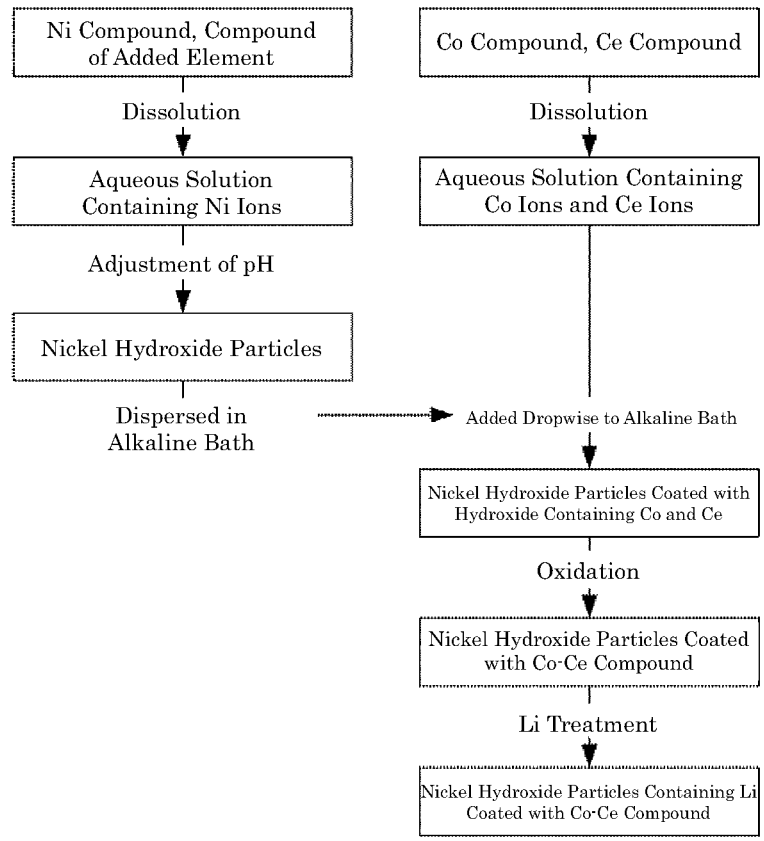
FIG. 3: A flow chart showing a process of preparing an active material according to an embodiment.

As shown in FIG. 3, the active material particles of the present embodiment, in which the surface of the core layer containing nickel hydroxide particles is coated with the conductive auxiliary layer containing cobalt oxyhydroxide and cerium dioxide and which contains lithium, are prepared by preparing nickel hydroxide particles, precipitating a hydroxide layer containing cobalt and cerium on the surface of the particles, and subjecting the hydroxide coating layer containing cobalt and cerium to an oxidation treatment and a lithium impregnation treatment.

The particles containing nickel hydroxide serving as a core layer can be prepared by changing the pH of the aqueous solution obtained by dissolving a nickel compound (hereinafter, sometimes abbreviated as an "aqueous Ni solution"). Specifically, the particles of $Ni(OH)_2$ can be precipitated by preparing an aqueous solution of a salt of a strong acid such as nickel sulfate, and shifting the pH of the aqueous solution to alkaline side. The precipitate is collected by filtration, washed with water, and dried to obtain spherical nickel hydroxide particles.

As the nickel compound, various types of water-soluble compounds such as nickel sulfate can be used. Further, an ammine complex of nickel may be produced by adding an ammonium compound to the aqueous solution.

As regards a method of changing the pH, it is possible to add the above-mentioned aqueous Ni solution dropwise to a bath for precipitation controlled so as to keep a constant pH or to add an alkaline aqueous solution to an aqueous Ni solution.

As regards a specific example of a method of adding the aqueous Ni solution dropwise, an aqueous solution obtained by dissolving nickel sulfate is added dropwise to a 1 mol/L aqueous ammonium sulfate solution which is controlled so as to keep a pH of 12 and a temperature of 45° C. while vigorously stirring, and thereby particles of nickel hydroxide can be precipitated. The pH can be adjusted by appropriately adding, for example, a 18% by mass aqueous NaOH solution.

As regards a specific example of a method of adding an alkaline aqueous solution to the aqueous Ni solution, ammonium sulfate and an aqueous NaOH solution are added to the aqueous Ni solution to produce an ammine complex, and further an aqueous NaOH solution is added dropwise to a reaction system while vigorously stirring, and the reaction system is controlled so as to maintain a reaction bath temperature within a range of 45° C.±2° C. and a pH within a range of 12±0.2, and thereby particles of nickel hydroxide can be precipitated.

When an element other than nickel is added, a compound of the element to be added can be dissolved in the aqueous solution together with the nickel compound. For example, when various water-soluble compounds of Zn or Co are dissolved in the aqueous solution together with the Ni compound and the pH of the aqueous solution is changed, a coprecipitate of Ni with Zn or Co can be obtained.

For the purpose of precipitating a hydroxide layer containing cobalt and cerium on the surface of the core layer particles containing nickel hydroxide, it is possible to employ a method of adding an aqueous solution containing cobalt ions and cerium ions (hereinafter, sometimes abbreviated as an "aqueous Co—Ce solution") dropwise to an aqueous solution in which nickel hydroxide particles are dispersed and whose pH has been adjusted. Thereafter, the solid matter is collected by filtration, washed with water, and dried, and thereby, composite particles, in which the surface of the core layer particles containing nickel hydroxide is coated with a hydroxide layer containing cobalt and cerium, can be obtained.

The aqueous Co—Ce solution is prepared by dissolving a cobalt compound and a cerium compound in water. As the cobalt compound and the cerium compound, various types of water-soluble compounds such as cobalt sulfate and cerium nitrate can be used. In this case, concentrations of cobalt and cerium in a precipitate can be adjusted by changing the ratio between the cobalt compound and the cerium compound to be dissolved.

A specific example is as follows. Nickel hydroxide particles are mixed and dispersed in a 0.1 mol/L aqueous ammonium sulfate solution, and the resulting mixture is controlled so as to keep a pH of 9 and a temperature of 45° C. and vigorously stirred. The pH can be adjusted by using, for example, a 18% by mass aqueous NaOH solution. To the solution, an aqueous solution, which is obtained by dissolving cobalt sulfate and cerium nitrate in such a way that the total of Co atoms and Ce atoms is 1.6 mol/L and the atomic ratio between Co and Ce is 7:3, is added dropwise to precipitate a hydroxide layer containing cobalt and cerium on the surface of the core layer particles containing nickel hydroxide. Thereby, a hydroxide layer containing cobalt and cerium can be precipitated on the surface of the core layer particles containing nickel hydroxide.

Composite particles in which the surface of the core layer particles containing nickel hydroxide is coated with a cobalt-cerium compound can be obtained by subjecting composite particles, in which the surface of the core layer particles containing nickel hydroxide is coated with a hydroxide layer containing cobalt and cerium, to an oxidation treatment, and then collecting the solid matter, washing it with water and drying it.

From the results of the structural analysis by X-ray diffraction described above, it is thought that the cobalt-cerium compound is made principally of a cobalt oxyhydroxide phase having a crystal structure of a space group R3m structure and a cerium dioxide phase having a crystal structure which is a fluorite structure and a space group Fm3m structure, and may include a slight amount of a tricobalt tetroxide crystal phase. Further, it is thought that a Na atom penetrates into the cobalt oxyhydroxide phase when the composite particles are oxidized in the coexistence of the aqueous NaOH solution.

In the oxidation treatment, it is preferred to heat the composite particle in the coexistence of the alkaline aqueous solution principally made of sodium hydroxide and oxygen. The reason for this is that sodium has an action of accelerating the oxidation of cobalt in the hydroxide.

The amount of NaOH to be used is preferably selected in such a way that the ratio (Na/(Co+Ce+Ni)) is 0.5 or more in terms of molar ratio.

The heating temperature can be set to 60° C. or more and the boiling point of the aqueous sodium hydroxide solution or less, and preferably 100° C. or more and the boiling point of the aqueous sodium hydroxide solution or less.

When the valence of Ni is not increased by the oxidation treatment of cobalt, a Ni partial oxidation step of increasing the oxidation number of Ni to a range of 2.1 to 2.2 by use of an oxidant may be added between the oxidation treatment and the Li impregnation treatment of cobalt. By this step, discharge reserve can be inhibited.

A more specific example of the oxidation treatment is as follows. 40 g of an aqueous NaOH solution having a concentration of 48% by mass can be added to 50 g of particles in which the surface of the core layer particles containing nickel hydroxide is coated with a hydroxide layer containing cobalt and cerium, and the resulting mixture can be heated at 120° C. for 1 hour in the air. The boiling point of the 48% by mass aqueous NaOH solution is 138° C. under atmospheric pressure.

The particles can be made to contain lithium by immersing the composite particles subjected to the oxidation treatment in an aqueous LiOH solution. It is thought that this method enables the core layer of nickel hydroxide and the conductive auxiliary layer to contain lithium. The obtained particles are collected by filtration, washed with water, and dried to obtain active material particles of the present embodiment. In this case, the ultimate Li content can be controlled by changing the concentration of a LiOH electrolyte solution and the number of times of water washing.

As regards the conditions of Li impregnation treatment, the LiOH concentration, treatment temperature, treatment time, etc. may be appropriately adjusted. In the examples described later, a 0.5 to 1 mol/L aqueous LiOH solution was maintained at 50° C. and stirred for 2 hours. In mass production lines, it is probably preferred that the Li impregnation treatment is performed at a temperature of 50 to 80° C. in a concentration of 0.3 to 0.4 mol/L in consideration of the pH or viscosity of a solution.

The positive active material for an alkaline secondary battery which is an embodiment of the present invention can be prepared by the above-mentioned method.

Next, as an embodiment of an alkaline secondary battery of the present invention, a method of preparing a nickel-metal hydride battery having a wound electrode will be described.

In the case of the nickel-metal hydride battery, the preparation method is roughly as follows, for example.

An aqueous solution of carboxylmethylcellulose (CMC) or the like is added to the active material particles, and the resulting mixture is formed into a paste. The paste is filled into a substrate having electric conductivity such as a porous nickel substrate (nickel foam substrate), then dried, and pressed to a predetermined thickness to form a positive electrode for an alkaline secondary battery.

A paste principally made of a hydrogen storage alloy powder is applied onto a negative substrate made of a punched steel sheet formed by plating iron with nickel, and dried, and then the steel sheet is pressed to a predetermined thickness to prepare a negative electrode. The negative electrode, a separator made of a polypropylene nonwoven fabric and the above-mentioned positive electrode are laminated, and the resulting laminate is wound into a roll. A positive current collecting plate and a negative current collecting plate are attached to the laminate, and then the resulting laminate is inserted into a closed-end cylindrical case, and an electrolyte solution is poured into the case. Thereafter, a ring gasket is attached around the case, and a disc-shaped lid with a cap-shaped terminal is attached to the case in a state that the lid is in electric contact with the positive current collecting plate, and fixed by crimping an open end of the case.

The electrolyte solution preferably contains LiOH. However, even when LiOH is used, it can be used only up to about 1.5 mo/L from the viewpoint of solubility.

When the electrolyte solution contains LiOH, the effect of improving the discharge capacity can be achieved even when the positive active material particles are not subjected to the Li impregnation treatment and do not contain Li since Li is incorporated into the active material in the process of performing charge/discharge in the electrolyte solution containing Li. The lithium content in the active material at this time is about 0.05 to 0.1% by mass.

It is more preferred that a positive active material which comes to contain Li by the lithium impregnation treatment is used and that the electrolyte solution also contains LiOH.

EXAMPLES

Examples 1 to 7

An aqueous solution obtained by dissolving nickel sulfate, zinc sulfate and cobalt sulfate was added dropwise to a 1 mol/L aqueous ammonium sulfate solution which was controlled so as to keep a pH of 12 and a temperature of 45° C. while vigorously stirring, and thereby, spherical high density particles, having an average particle diameter of 10 μm and principally made of nickel hydroxide (hereinafter, also simply referred to as nickel hydroxide particles), were obtained. The obtained particles were separated, washed, and dried. The proportion of Ni, Zn and Co contained in the obtained particles was 91:7:2 in terms of mass ratio of elements. The pH of the aqueous ammonium sulfate solution was adjusted by using a 18% by mass aqueous NaOH solution.

The obtained nickel hydroxide particles were added to a 0.1 mol/L aqueous ammonium sulfate solution, and the resulting aqueous solution was controlled so as to keep a pH of 9 and a temperature of 45° C. and vigorously stirred. The pH was adjusted by using a 18% by mass aqueous NaOH solution. To the solution, an aqueous solution, which was obtained by dissolving cobalt sulfate and cerium nitrate in such a way that the total of Co atoms and Ce atoms was 1.6 mol/L and the atomic ratio between Co and Ce was 7:3, was added dropwise. Thereby, a hydroxide layer containing cobalt and cerium was precipitated on the surface of the core layer particles containing nickel hydroxide. Then, the hydroxide layer was filtrated, washed with water, and dried to obtain nickel hydroxide particles coated with a hydroxide containing cerium and cobalt. As regards the amount of the precipitate on the surface of the nickel hydroxide particles, the amount of Co and Ce (the mass on the metal equivalent basis) contained in the precipitate was about 4% by mass with respect to the total amount of nickel hydroxide, Co and Ce.

40 g of a 48% by mass aqueous NaOH solution was added to 50 g of the obtained composite particles, and the resulting mixture was heated at 120° C. for 1 hour in the air to perform an oxidation treatment. The treated particles were washed with water and dried.

As regards the cobalt-cerium compound which coats the surface, since the atomic ratio between Co and Ce in the aqueous Co—Ce solution was 7:3, it is thought from Table 4 that the cobalt-cerium compound includes about 57% by mass of a cobalt oxyhydroxide phase, about 38% by mass of a cerium dioxide phase and about 6% by mass of a tricobalt tetroxide phase and that the abundance of the cerium dioxide phase to the total of the cobalt oxyhydroxide phase and the cerium dioxide phase is about 40%.

50 g of the composite particles subjected to the oxidation treatment were dispersed in 1000 mL of an aqueous LiOH solution having a predetermined concentration between 0.5 mol/L and 1 mol/L, and stirred for 2 hours while maintaining the temperature of the dispersion liquid at 50° C. The resulting particles were dispersed in 500 mL of pure water at ordinary temperature and washed with water predetermined number of times by decantation, and then dried to obtain desired active material particles.

The concentration of Li was analyzed by ICP-AES (inductively coupled plasma optical emission spectrophotometric analysis). The ultimate Li content of the active material particles can be controlled by changing the concentration of LiOH at the time of the Li impregnation treatment and the condition of water washing. In these examples, the Li content was 0.03 to 0.36% by mass.

A 1% by mass aqueous solution of carboxylmethylcellulose (CMC) was added to the active material particles and the resulting mixture was kneaded, and in this, polytetrafluoroethylene (PTFE) was mixed to form a paste. The ratio between the active material particles and PTFE (solid content) was set to 97:3. The positive electrode paste was filled into a nickel foam substrate having a thickness of 1.4 mm and an area density of 380 g/m$^2$, and dried, and then the resulting substrate was rolled to form an original sheet. The original sheet was cut into a size of 4 cm in length and 6 cm in width. The active material particles were filled into the substrate so that the electrode capacity of a plate of this size was 500 mA. The plate was used as a positive electrode and a hydrogen storage alloy electrode was used as a negative electrode, and a separator was interposed between these electrodes to configure an open type cell. As an electrolyte solution, a 6.8 mol/L aqueous KOH solution was used.

Comparative Examples 1 to 9

For comparison with the above-mentioned examples, the following active material and an open type cell using the active material were prepared.

Active material particles not containing Ce (Comparative Examples 2 to 9) were prepared by the same method as in Examples 1 to 8 except that an aqueous solution obtained by dissolving only cobalt sulfate was used in place of the aqueous solution obtained by dissolving cobalt sulfate and cerium nitrate.

Active material particles not containing Li (Comparative Example 1) were prepared by the same method as in Examples 1 to 8 except that a Li treatment in which the composite particles were dispersed and stirred in the aqueous LiOH solution was not performed.

Active material particles not containing Ce and Li (Comparative Example 2) were prepared by the same method as in Examples 1 to 8 except that an aqueous solution obtained by dissolving only cobalt sulfate was used in place of the aqueous solution obtained by dissolving cobalt sulfate and cerium nitrate and a Li treatment in which the composite particles were dispersed and stirred in the aqueous LiOH solution was not performed.

Open type cells were prepared by the same method as in Examples 1 to 8 by using these active material particles for comparison.

(Test Method)

On the above-mentioned samples of examples and comparative examples, under a temperature environment of 20° C., charging was performed at a charging current of 0.1 ItA for 15 hours, and the battery was paused for 1 hour, and then discharging was performed at a discharging current of 0.2 ItA setting the end potential at 0.0 V (vs. Hg/HgO), and this cycle was repeated to obtain a discharge capacity per gram of the active material.

(Test Result)

The measurement results of the discharge capacity are shown in Table 1 and FIG. 1. "Co, Ce" in the box of the conductive auxiliary layer in Table 1 represents that the conductive auxiliary layer contains the cerium dioxide phase, and "Co" represents that the conductive auxiliary layer does not contain the cerium dioxide phase.

In the comparison between samples not containing Li, Comparative Example 1 in which the conductive auxiliary layer contains the cerium dioxide phase has a larger discharge capacity than Comparative Example 2 in which the conductive auxiliary layer does not contain the cerium dioxide phase. The reason for this is thought to be that the specific resistance of the conductive auxiliary layer is decreased by virtue of the existence of the cerium dioxide phase, and therefore the utilization factor of the active material is improved.

The discharge capacity is increased as the content of Li in the active material particles is increased. In Comparative Example 1 and Examples 1 to 7 in which the conductive auxiliary layer contains the cerium dioxide phase, the effect of inclusion of Li is large compared with Comparative Examples 2 to 9 in which the conductive auxiliary layer does not contain the cerium dioxide phase, and the discharge capacity is remarkably increased. Comparative Example 1 and Examples 1 to 7 have a remarkable effect even when the Li content is 0.03% by mass, and the discharge capacity is increased up to 0.36% by mass as the upper limit of the experiment as the Li content is increased.

In FIG. 1, in the case of the active material coated with a Co compound not containing Ce, although the discharge capacity is increased as the lithium content is increased, the discharge capacity tends to peak out in a region where the Li content exceeds the range of 0.15 to 0.2% by mass. The increase in the discharge capacity is thought to be attributed to the utilization of γ type nickel oxyhydroxide based on the intercalation of Li into nickel hydroxide, and the discharge capacity is thought to peak out because the amount of γ type nickel oxyhydroxide to be produced becomes constant at a certain Li content.

On the other hand, the discharge capacity of the active material coated with a Co—Ce compound is increased clearly more largely than in the case of the active material coated with a Co compound as the lithium content is increased, and there is no tendency of peak out in the range where data were obtained. A more remarkable increase in the discharge capacity in the active material coated with the Co—Ce compound probably results from the fact that an improvement in the electric conductivity of the Co—Ce compound is more remarkable than that of the Co compound. The reason for this is that a higher electric conductivity enables deep discharge of nickel, leading to the increase in the discharge capacity. It is known that a crystal structure is distorted when Li is incorporated into Co, and it is thought that the distortion of the crystal structure due to Li intercalation operates in favor of the improvement in the electric conductivity because a part of Co is replaced with Ce.

TABLE 1

|  | Conductive Auxiliary Layer | Li Concentration in Positive Active Material (% by mass) | Discharge Capacity (mAh/g) |
| --- | --- | --- | --- |
| Comparative Example 1 | Co, Ce | 0.000 | 262.4 |
| Example 1 | Co, Ce | 0.032 | 265.3 |
| Example 2 | Co, Ce | 0.043 | 266.1 |
| Example 3 | Co, Ce | 0.079 | 266.8 |
| Example 4 | Co, Ce | 0.104 | 269.8 |
| Example 5 | Co, Ce | 0.194 | 270.6 |
| Example 6 | Co, Ce | 0.282 | 276.6 |
| Example 7 | Co, Ce | 0.356 | 279.5 |
| Comparative Example 2 | Co | 0.000 | 261.2 |
| Comparative Example 3 | Co | 0.035 | 262.3 |
| Comparative Example 4 | Co | 0.055 | 263.6 |
| Comparative Example 5 | Co | 0.159 | 263.8 |
| Comparative Example 6 | Co | 0.163 | 266.7 |
| Comparative Example 7 | Co | 0.228 | 267.0 |
| Comparative Example 8 | Co | 0.361 | 267.6 |
| Comparative Example 9 | Co | 0.370 | 268.3 |

Electrolyte solution: 6.8 mol/L aqueous KOH solution

Examples 8 and 9

Next, each open type cell was prepared changing the composition of the electrolyte solution, and an experiment was carried out.

The cell of Example 8 was prepared by the same method as in Examples 1 to 7 except that the same active material particles (the conductive auxiliary layer contains the cerium dioxide phase and the Li content rate is 0.194% by mass) as in Example 5 were used, and the composition of the electrolyte solution was 7 mol/L KOH.

The cell of Example 9 was prepared by the same method as in Example 8 except that a 6.5 mol/L KOH and 0.5 mol/L LiOH were used as an electrolyte solution.

Comparative Example 10 and Examples 10 to 12

The cells of Comparative Example 10 and Examples 10 to 12 were prepared by the same method as in Examples 1 to 7 except that the same active material particles (the conductive auxiliary layer contains the cerium dioxide phase and the Li impregnation treatment is not performed) as in Comparative Example 1 were used, and the composition of the electrolyte solution was 6 to 7 mol/L KOH and 0 to 1 mol/L LiOH. The composition of each electrolyte solution is shown in Table 2.

Comparative Examples 11 to 16

The cell of Comparative Example 11 was prepared by the same method as in Example 8 except that the same active material particles (the conductive auxiliary layer does not contain the cerium dioxide phase and the Li content rate is 0.163% by mass) as in Comparative Example 6 were used.

The cell of Comparative Example 12 was prepared by the same method as in Comparative Example 11 except that a 6.5 mol/L KOH and 0.5 mol/L LiOH were used as an electrolyte solution.

The cells of Comparative Examples 13 to 16 were prepared by the same method as in Comparative Example 10 and Examples 10 to 12 except that the same active material particles (the conductive auxiliary layer does not contain the cerium dioxide phase and the Li treatment is not performed) as in Comparative Example 2 were used. The composition of each electrolyte solution is shown in Table 2.

(Test Result)

Figure 2:
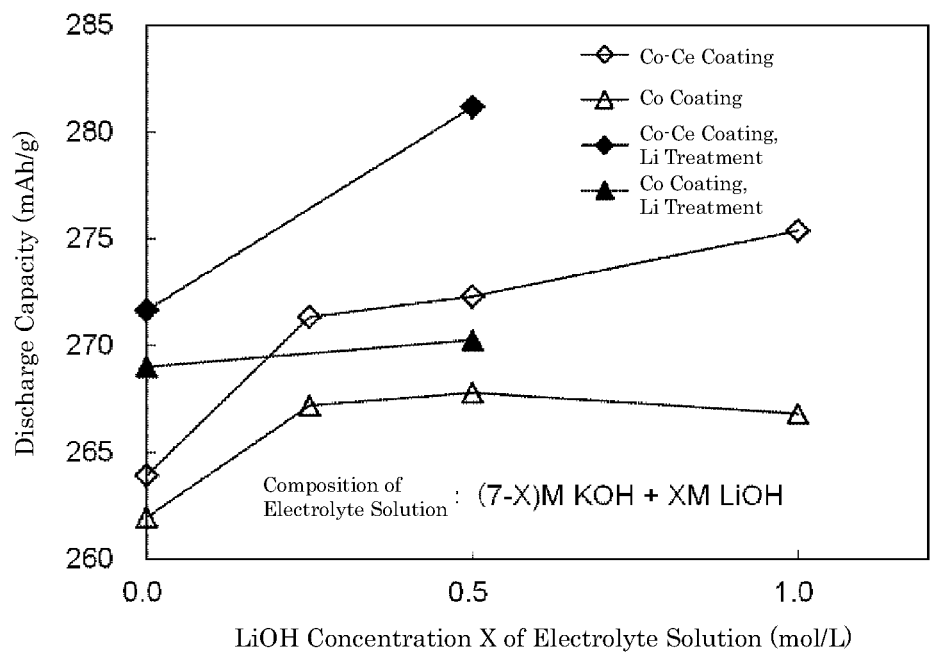
FIG. 2: A graph showing the discharge capacity of batteries of examples and comparative examples.

The measurement results of the discharge capacity are shown in Table 2 and FIG. 2. The test method is the same as that in Table 1 and FIG. 1.

It is found from the results of Comparative Examples 13 to 16 (the symbols Δ in FIG. 2) that the inclusion of LiOH in the electrolyte solution increases the discharge capacity. The reason for this is probably that Li in the electrolyte solution is incorporated into the active material.

Also in the results of Comparative Example 10 and Examples 10 to 12 (the symbols ◇ in FIG. 2), the inclusion of LiOH in the electrolyte solution increases the discharge capacity. In the comparison between the samples of Examples 10 to 12 and the samples of Comparative Examples 14 to 16, which have the same LiOH concentration, the samples of Examples 10 to 12 in which the conductive auxiliary layer contains the cerium dioxide phase exhibit a larger effect of LiOH on the increase in the discharge capacity. The reason for this is probably that the electric conductivity is more largely improved when the Co—Ce compound contains Li.

Next, as regards the case where the active material particles contain Li, in the comparison of the discharge capacity between Comparative Example 13 and Comparative Example 11, Comparative Example 15 and Comparative Example 12, Comparative Example 10 and Example 8, and Example 11 and Example 9, the discharge capacity is large in the case where the active material particles contain Li, and this result is similar to that of Table 1 and FIG. 1.

Moreover, in Example 9 in which the active material particles have the cerium dioxide phase in the conductive auxiliary layer and contain lithium, and the electrolyte solution contains LiOH, the discharge capacity is significantly large, and a synergetic effect achieved by these constituents is clearly shown.

The synergetic effect is shown probably because Li intercalated into the active material is diffused into a solution when Li is not present in the electrolyte solution, resulting in a reduction of the Li concentration in the active material. However, in FIGS. 1 and 2, when comparing the case where the active material is subjected to the Li impregnation treatment with the case where the active material inherently does not contain Li but is used in the electrolyte solution containing LiOH, in the latter case, the increase in the discharge capacity peaks out even when the LiOH concentration is increased, but such a tendency is not found in the former case. From this, it is more likely that the form of Li contained in the positive active material is different between the case where the Li impregnation treatment is previously performed and the case where charge/discharge is performed in the electrolyte solution containing LiOH. The reason why Example 9 exhibited the largest discharge capacity in FIG. 2 is probably that the effect of the Li impregnation treatment is combined with the effect of LiOH.

because of inclusion of the cerium dioxide phase in the conductive auxiliary layer and inclusion of lithium in the active material.

TABLE 3

|  | Conductive Auxiliary Layer | Li Impregnation Treatment | Amount of Reduction Current (mAh) |
|---|---|---|---|
| Experiment 1 | Co | None | 14.4 |
| Experiment 2 | Co | Yes | 3.7 |

TABLE 21

|  | Conductive Auxiliary Layer | Li Impregnation Treatment | Li Concentration in Positive Active Material (% by mass) | Composition of Electrolyte Solution (M represents mol/L) | Discharge Capacity (mAh/g) |
|---|---|---|---|---|---|
| Example 8 | Co, Ce | Yes | 0.194 | 7.00 M KOH | 271.6 |
| Example 9 | Co, Ce | Yes | 0.194 | 6.50 M KOH + 0.50 M LiOH | 281.2 |
| Comparative Example 10 | Co, Ce | None | — | 7.00 M KOH | 263.9 |
| Example 10 | Co, Ce | None | — | 6.75 M KOH + 0.25 M LiOH | 271.3 |
| Example 11 | Co, Ce | None | — | 6.50 M KOH + 0.50 M LiOH | 272.3 |
| Example 12 | Co, Ce | None | — | 6.25 M KOH + 0.75 M LiOH | 275.4 |
| Comparative Example 11 | Co | Yes | 0.163 | 7.00 M KOH | 269.0 |
| Comparative Example 12 | Co | Yes | 0.163 | 6.50 M KOH + 0.50 M LiOH | 270.2 |
| Comparative Example 13 | Co | None | — | 7.00 M KOH | 261.9 |
| Comparative Example 14 | Co | None | — | 6.75 M KOH + 0.25 M LiOH | 267.2 |
| Comparative Example 15 | Co | None | — | 6.50 M KOH + 0.50 M LiOH | 267.8 |
| Comparative Example 16 | Co | None | — | 6.25 M KOH + 0.75 M LiOH | 266.8 |

Next, the amount of reduction current in the cases where the cobalt compound and the cobalt-cerium compound (compounds in which the "content rate of cerium" is 0 and 30 atomic % in Table 4, hereinafter, both are collectively referred to as a "cobalt-cerium compound" in this paragraph) are not subjected to the Li impregnation treatment and where they are subjected to the Li impregnation treatment was measured. The samples correspond to the conductive auxiliary layers of the positive active material particles used in Comparative Example 2, Comparative Example 6, Comparative Example 1 and Example 5. The amount of reduction current was measured by use of an apparatus shown in FIG. 8. A working electrode 101 filled with the cobalt-cerium compound was prepared by the following method. A synthesized cobalt-cerium compound was added to a 1.2% by mass aqueous CMC solution and kneaded, and in this, a 40% by mass water dispersion of PTFE was mixed. The ratio between the cobalt-cerium compound and PTFE (solid content) in the resulting mixture was set to 99:1. The positive electrode paste was filled into a nickel foam substrate having a thickness of 2.0 mm and an area density of 320 g/m², and dried, and then the resulting substrate was rolled to form an electrode sheet. The original sheet was cut into a size of 2 cm in length and 2 cm in width, and a tab for current collecting was attached to the original sheet to form a working electrode 101. The amount of the cobalt-cerium compound calculated from the filling amount into the electrode plate was 0.3 g. The applied potential was set to −0.9 V (Hg/HgO).

The results of measurement are shown in Table 3.

The reduction current, that is, the reduction resistance of cobalt oxyhydroxide was found to tend to be improved TABLE 3-continued

|  | Conductive Auxiliary Layer | Li Impregnation Treatment | Amount of Reduction Current (mAh) |
|---|---|---|---|
| Experiment 3 | Co, Ce | None | 4.8 |
| Experiment 4 | Co, Ce | Yes | 3.5 |

Description of Reference Signs
101 working electrode
102 reference electrode
103 counter electrode
104 control device

The invention claimed is:

1. A positive active material for an alkaline secondary battery comprising a core layer containing nickel hydroxide and a conductive auxiliary layer which coats a surface of the core layer, wherein
    the conductive auxiliary layer contains a cobalt oxyhydroxide phase having a rhombohedral crystal structure and a space group R3m crystal structure and a cerium dioxide phase having a fluorite crystal structure and a space group Fm3m crystal structure,
    the active material contains lithium, and
    the conductive auxiliary layer comprises 10 atomic % or more and 70 atomic % or less cerium.

2. The positive active material for an alkaline secondary battery according to claim 1, wherein
    the active material is subjected to a lithium impregnation treatment.

3. The positive active material for an alkaline secondary battery according to claim 1, wherein the core layer and the conductive auxiliary layer contain lithium.

4. The positive active material for an alkaline secondary battery according to claim 1, wherein an amount of lithium contained in the active material corresponds to 0.03% by mass or more and 0.36% by mass or less of lithium as element.

5. The positive active material for an alkaline secondary battery according to claim 1, wherein the existence ratio of the cerium dioxide phase to a total of the cobalt oxyhydroxide phase and the cerium dioxide phase in the conductive auxiliary layer is 6.5% by mass or more and 88.2% by mass or less.

6. An alkaline secondary battery comprising the positive active material for an alkaline secondary battery according to claim 1.

7. An alkaline secondary battery comprising:
a positive active material for an alkaline secondary battery having a core layer containing nickel hydroxide and a conductive auxiliary layer which coats the surface of the core layer, wherein the conductive auxiliary layer contains a cobalt oxyhydroxide phase having a rhombohedral crystal structure and a space group R3m crystal structure and a cerium dioxide phase having a fluorite crystal structure and a space group Fm3m crystal structure, and the conductive auxiliary layer comprises 10 atomic % or more and 70 atomic % or less cerium; and
an electrolyte solution containing lithium hydroxide.

8. The alkaline secondary battery according to claim 6, further comprising an electrolyte solution containing lithium hydroxide.

9. The alkaline secondary battery according to claim 7, wherein the electrolyte solution contains lithium hydroxide of 0.25 mol/L or more and 1 mol/L or less.

10. The positive active material for an alkaline secondary battery according to claim 1, wherein the cobalt oxyhydroxide phase comprises cerium at 3a1 site, 3a2 site, or combination thereof of the crystal structure, and the cerium dioxide phase comprises cobalt at 4a site of the crystal structure.

11. The alkaline secondary battery according to claim 7, wherein the cobalt oxyhydroxide phase comprises cerium at 3a1 site, 3a2 site, or combination thereof of the crystal structure, and the cerium dioxide phase comprises cobalt at 4a site of the crystal structure.

12. The positive active material for an alkaline secondary battery according to claim 1, wherein the conductive auxiliary layer comprises 30 atomic % or more and 70 atomic % or less cerium.

13. The alkaline secondary battery according to claim 7, wherein the conductive auxiliary layer comprises 30 atomic % or more and 70 atomic % or less cerium.

* * * * *